(12) United States Patent
Holloway et al.

(10) Patent No.: US 10,185,969 B1
(45) Date of Patent: Jan. 22, 2019

(54) SYSTEMS AND METHODS FOR MONITORING ADVERTISEMENTS

(71) Applicants: Rick Holloway, Huntsville, AL (US); Jim Morris, Huntsville, AL (US)

(72) Inventors: Rick Holloway, Huntsville, AL (US); Jim Morris, Huntsville, AL (US)

(73) Assignee: Outdoorlink, Inc., Huntsville, AL (US)

( * ) Notice: Subject to any disclaimer, the term of this patent is extended or adjusted under 35 U.S.C. 154(b) by 0 days.

(21) Appl. No.: 14/321,512

(22) Filed: Jul. 1, 2014

Related U.S. Application Data

(60) Provisional application No. 61/841,714, filed on Jul. 1, 2013.

(51) Int. Cl.
*G06Q 30/02* (2012.01)

(52) U.S. Cl.
CPC .................. *G06Q 30/0241* (2013.01)

(58) Field of Classification Search
None
See application file for complete search history.

(56) References Cited

U.S. PATENT DOCUMENTS

| | | | | |
|---|---|---|---|---|
| 8,544,033 B1* | 9/2013 | Acharya | ................. | H04H 60/33 725/10 |
| 8,818,101 B1* | 8/2014 | Lim | .......................... | G06T 7/33 345/629 |
| 2001/0014872 A1* | 8/2001 | Hunter | ................... | G06Q 30/02 709/207 |
| 2003/0126013 A1* | 7/2003 | Shand | .................... | G06Q 30/02 705/14.52 |
| 2003/0146891 A1* | 8/2003 | Poliakine | .............. | G06F 3/1446 345/87 |
| 2004/0100437 A1* | 5/2004 | Hunter | .............. | G02F 1/133617 345/102 |
| 2004/0174597 A1* | 9/2004 | Craig | ..................... | G06Q 30/02 359/484.01 |
| 2007/0124157 A1* | 5/2007 | Laumeyer | .............. | G01C 21/30 701/420 |
| 2007/0271585 A1* | 11/2007 | Taguchi | ............... | H04N 17/004 725/105 |
| 2008/0120181 A1* | 5/2008 | Chang | .................... | G06Q 30/02 705/14.61 |

(Continued)

OTHER PUBLICATIONS

Excite Billboard Installation Instructions for 20mm and 23mm Pitch series signs (Published on Mar. 19, 2008).*

*Primary Examiner* — James M Detweiler
(74) *Attorney, Agent, or Firm* — Maynard Cooper & Gale, P.C.; Jon E. Holland

(57) ABSTRACT

A system for monitoring advertisements has a camera that is positioned to capture an image of an advertisement. The camera is coupled to a control module that controls operation of the camera and wirelessly transmits data defining the camera's images to a server. At any time, a user may contact the server to view images of the advertisement captured by the camera in order to verify the condition of the advertisement. The control module is configured to control the camera in order to automatically capture images at certain times, such at the start and end of an ad term, as well as from time-to-time during the ad term. Also, a user may initiate an image capture event from a remote location to view the current state of the advertisement in real time without actually traveling to the location of the advertisement.

2 Claims, 6 Drawing Sheets

(56) References Cited

U.S. PATENT DOCUMENTS

| | | | | |
|---|---|---|---|---|
| 2009/0257620 | A1* | 10/2009 | Hicks | G06Q 30/02 382/100 |
| 2009/0319231 | A1* | 12/2009 | Beland | G09F 9/30 702/183 |
| 2010/0153218 | A1* | 6/2010 | Wilson | G06Q 30/02 705/14.72 |
| 2012/0127324 | A1* | 5/2012 | Dickins | G09G 3/006 348/191 |
| 2013/0307975 | A1* | 11/2013 | Ford | B60Q 1/00 348/143 |
| 2014/0152786 | A1* | 6/2014 | Nicholson | H04N 21/812 348/61 |

* cited by examiner

SYSTEMS AND METHODS FOR MONITORING ADVERTISEMENTS

CROSS REFERENCE TO RELATED APPLICATION

This application claims priority to U.S. Provisional Patent Application No. 61/841,714, entitled "Systems and Methods for Monitoring Advertisements" and filed on Jul. 1, 2013, which is incorporated herein by reference.

RELATED ART

Many product or service providers, referred to herein as "advertising consumers," spend significant monetary resources for outdoor advertising, such as roadside billboards. Typically, an advertising consumer will contract with an outdoor advertising agency to display an advertisement for a certain time period, referred to hereafter as "ad term," such as a number of weeks or months. The advertising consumer often desires to receive assurance that the outdoor advertising agency has complied with the terms of the contract. Specifically, the advertising consumer often wants to ensure that the advertisement is displayed in good condition for the duration of the ad term.

Accordingly, the advertising agency often sends an employee or agent to the location of the advertisement for capturing images of the advertisement on one or more dates during the ad term. The advertising agency then provides the captured images to the advertising consumer as evidence that the advertisement has been appropriately displayed during the ad term. However, between the times of image capture, there is often little or no real assurance that the advertisement is appropriately displayed. If the advertisement is damaged due to weather or some other event or problem, the damage may not be discovered for an extended period of time. Some advertising consumers may choose to visit the premises of the advertisement from time-to-time in order to verify that the advertisement is appropriately displayed during the ad term. However, such verification can be burdensome and costly, particularly for an advertising consumer with a large number of advertisements. Further, even if an advertising consumer checks the advertisement from time-to-time, it is still possible for a problem with the advertisement to exist for an extended period of time before detection.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for monitoring advertisements. In one exemplary embodiment, a camera is mounted on or near an advertisement and is positioned to capture an image of the advertisement. The camera is coupled to a control module that controls operation of the camera and wirelessly transmits data defining the camera's images to a server, which stores such data. At any time, a user may contact the server to view images of the advertisement captured by the camera in order to verify the condition of the advertisement. The control module is configured to control the camera in order to automatically capture images at certain times, such as the start and end of an ad term, as well as from time-to-time during the ad term. The system also permits images of the advertisement to be captured on demand. That is, a user may initiate an image capture event from a remote location to view the current state of the advertisement in real time without actually traveling to the location of the advertisement.

Figure 1:
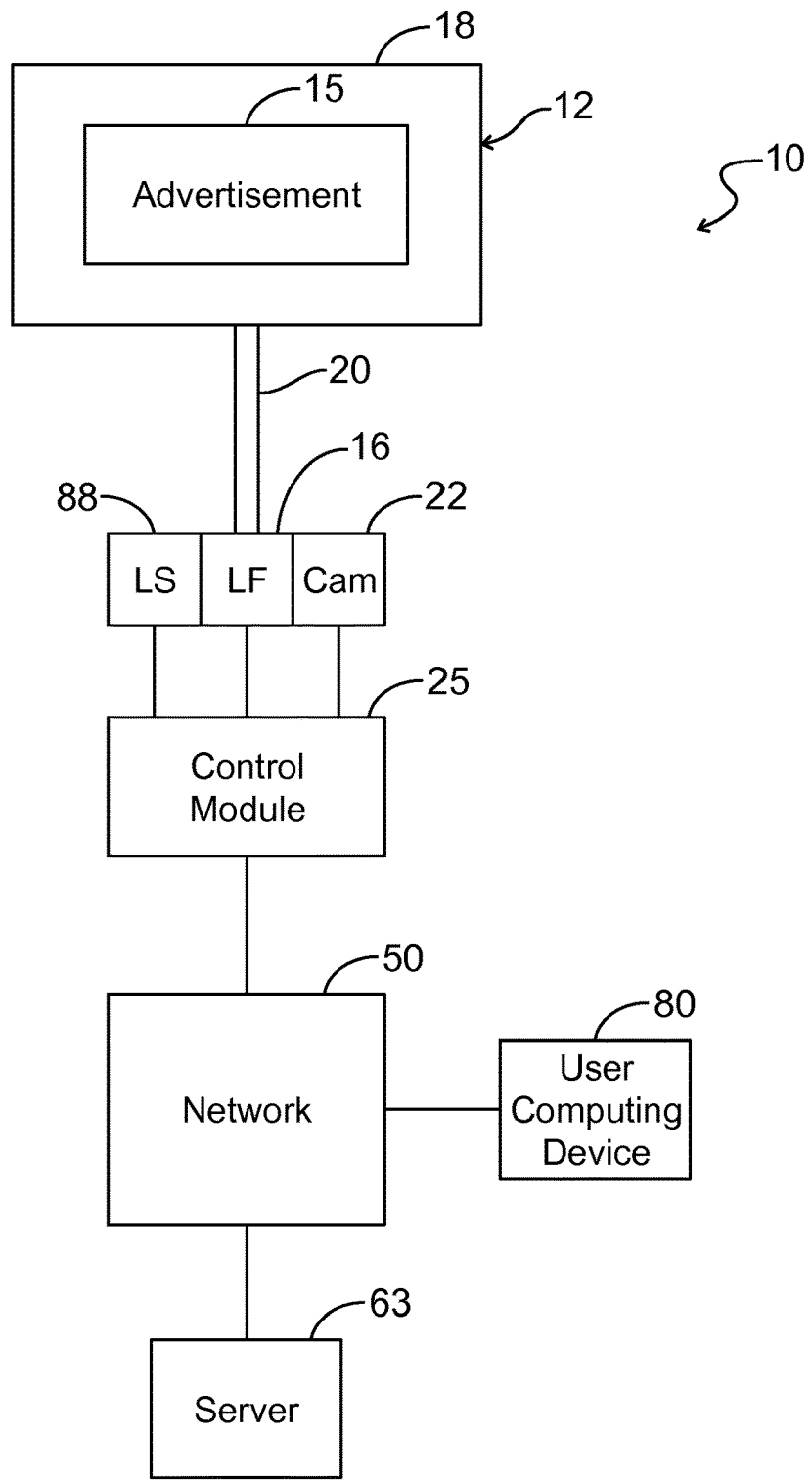
FIG. 1 is a block diagram illustrating an exemplary embodiment of a system for monitoring advertisements.
Figure 2:
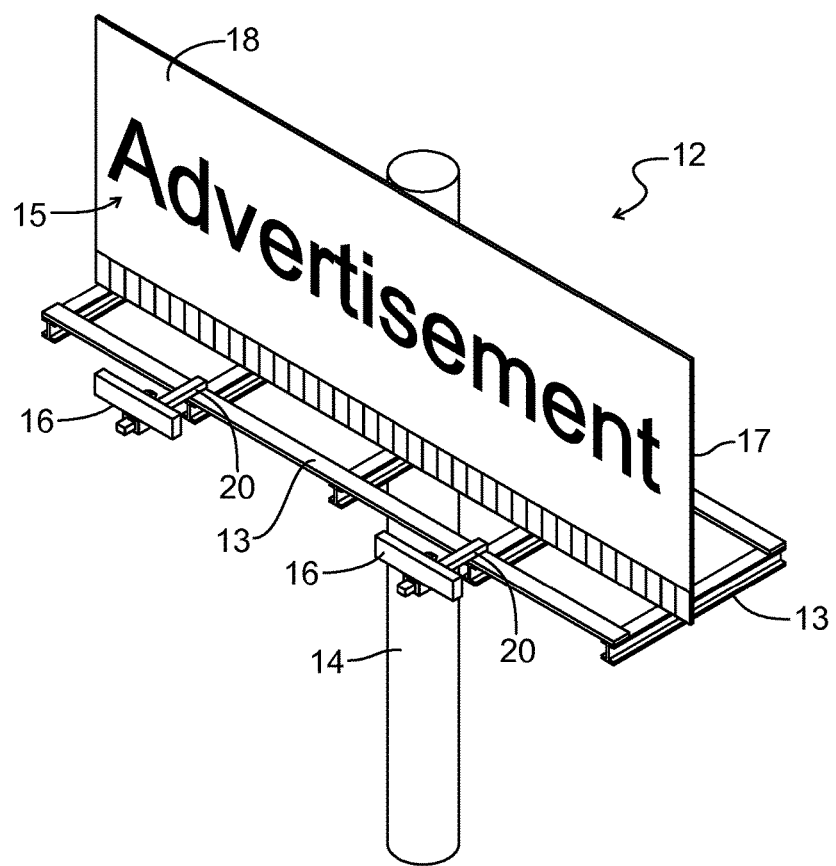
FIG. 2 is a perspective view illustrating an exemplary embodiment of an advertising system, such as is depicted by FIG. 1.

FIG. 1 depicts an exemplary embodiment of an advertisement monitoring system 10. As shown by FIG. 1, the system 10 comprises an advertising structure 12 for supporting an advertisement 15 and at least one lighting fixture (LF) 16 having a light source (not specifically shown in FIG. 1) for illuminating the advertisement 15. In one exemplary embodiment, the advertising structure 12 comprises a roadside billboard 18 that is positioned near a street so that occupants of vehicles traveling along the street can view the advertisement 15, which is positioned on or displayed from the billboard 18. As shown by FIG. 2, the billboard 18 includes a frame 13 for supporting a panel 17 on which the advertisement is positioned, and the frame 13 is mounted on a pole 14 so that the frame 13 is suspended some distance from the ground. However, in other embodiments, other types of advertisements are possible, including indoor advertisements. For illustrative purposes, it will be assumed hereafter that the advertising structure 12 comprises a roadside billboard, but it should be emphasized that the techniques described herein for monitoring the advertisement 15 on the structure 12 can be used to monitor other types of advertisements and advertising structures.

As described above, an advertisement 15 may be positioned on the billboard 18, and the advertisement 15 may comprise vinyl or some other material on which advertising content is printed or otherwise formed. In another exemplary embodiment, the advertisement 15 is electronic. In such an embodiment, the billboard 18 comprises light sources (not shown), such as light emitting diodes (LEDs), that are illuminated in order to display an electronic message and/or graphic.

The lighting fixture 16 is mounted on an arm 20 that is coupled to and extends from the frame 13. A camera (cam) 22 is mounted on the arm 20 as well. As an example, the camera 22 can be mounted directly on the arm 20, or the camera 22 can be mounted on the lighting fixture 16 that is coupled to the arm 20. In one exemplary embodiment, a bracket (not shown) is used to mount the camera 22 on the lighting fixture 16, but other techniques for mounting the camera 22 are possible. For example, the camera 22 may be mounted on a separate arm (not shown) extending from the billboard 18, or it is possible to position the camera at a location that does not require it to be mounted on the structure 12 at all. As an example, the camera 22 may be mounted on a pole (not shown) or other structure that is inserted into or positioned on the ground some distance away from the structure 12 so that the advertisement 15 is in view of the camera without the camera being coupled to the structure 12. In one embodiment where the camera 22 is mounted on the lighting fixture 16, the arm 20 extends just a few feet from the billboard 18, and the camera 22 is, therefore, positioned close to the billboard 18, such as about five to six feet away, but other distances are possible in other embodiments.

Figure 3:
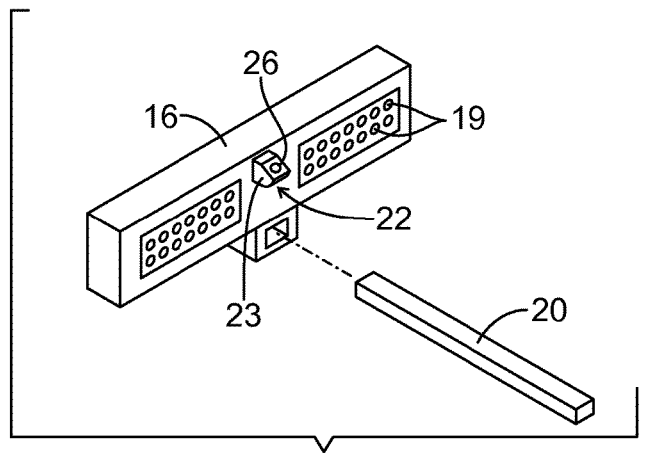
FIG. 3 is a perspective view illustrating an exemplary embodiment of a lighting fixture, such as is depicted by FIG. 2, having a camera mounted on the lighting fixture.
Figure 4:
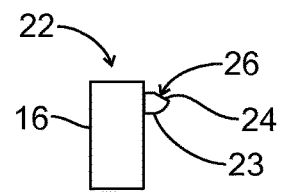
FIG. 4 is a side view illustrating a lighting fixture and camera, such as is depicted by FIG. 3.

FIG. 3 shows an exemplary embodiment of a lighting fixture 16 when the camera is mounted on a side of the lighting fixture 16 that faces the advertisement 15. As shown by FIG. 3, the lighting fixture 16 has a plurality of light sources 19, such as light emitting diodes or incandescent bulbs, for illuminating the advertisement 15. As shown by FIGS. 3 and 4, the camera 22 has a housing 23 that protrudes from a surface of the lighting fixture 16. The housing 23 has an angled surface 24 on which a lens 26 of the camera 22 is positioned. The surface 24 is angled relative to horizontal so that the lens 26 is directed toward the advertisement, and at least a portion of the advertisement 15 is in view of the lens 26. Moreover, the lens 26 is positioned for viewing the advertisement 15 so that the camera 22 may capture an image of the advertisement 15 as may be desired. Preferably, the camera 22 captures digital images that can be readily transmitted electronically, as will be described in more detail hereafter.

Figure 5:
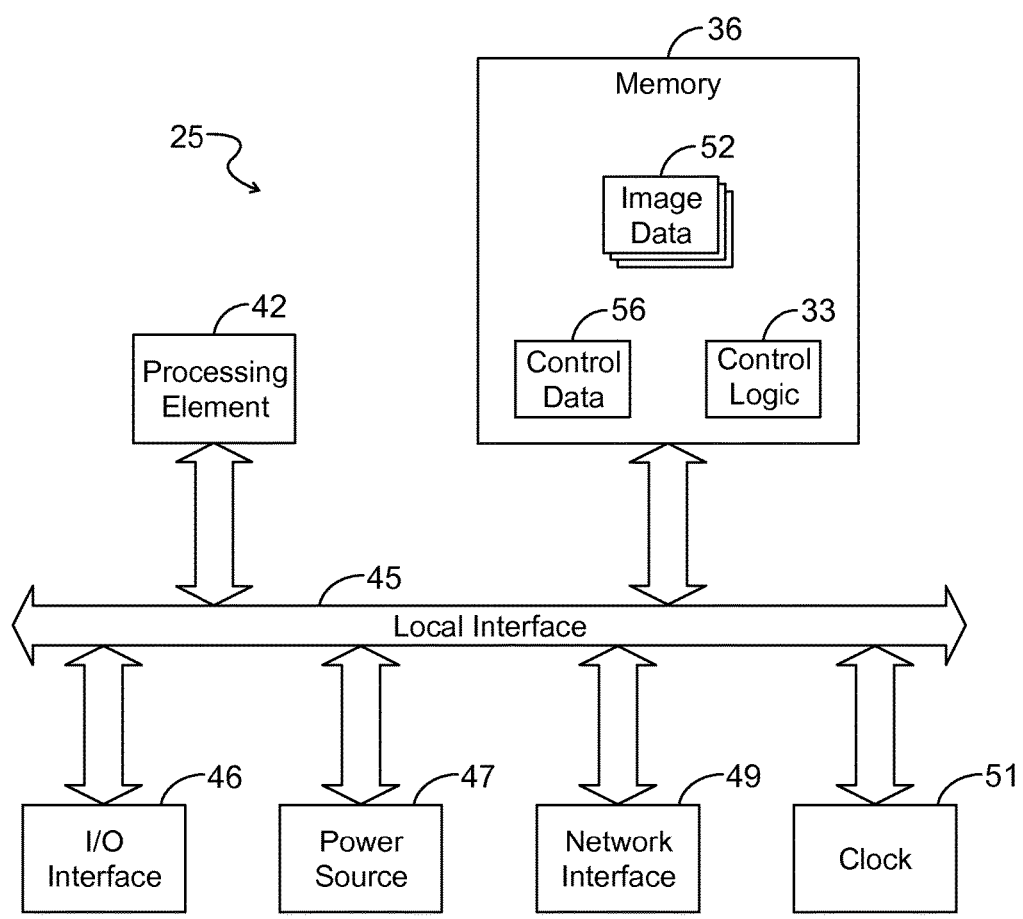
FIG. 5 is a block diagram illustrating an exemplary embodiment of a control module, such as is depicted by FIG. 1.

As shown by FIG. 1, the lighting fixture 16 and camera 22 are coupled to a control module 25 that is configured to control and/or monitor the light sources 19 of the lighting fixture 16 and/or the camera 22. FIG. 5 depicts an exemplary embodiment of the control module 25. As shown by FIG. 5, the control module 25 comprises control logic 33 for generally controlling the operation of the module 25, as will be described in more detail hereafter. The control logic 33 can be implemented in software, hardware, firmware or any combination thereof. In the exemplary module 25 illustrated by FIG. 5, the control logic 33 is implemented in software and stored in memory 36.

Note that the control logic 33, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary module 25 depicted by FIG. 5 comprises at least one conventional processing element 42, such as a digital signal processor (DSP) or a central processing unit (CPU), that communicates to and drives the other elements within the module 25 via a local interface 45, which can include at least one bus. As an example, when the control logic 33 is implemented in software, the processing element 42 is configured to execute instructions of such software. The module 25 also comprises an input/output (I/O) interface 46 for receiving inputs and providing outputs as may be desired. A power source 47, such as a battery, provides electrical power for the various components of the module 25, and a network transceiver 49 is configured to communicate with a network 50 (FIG. 1). The control module also has a clock 51.

Preferably, the contents of the module 25 are housed within an environmentally-hardened housing that is sealed in order to prevent water from reaching the electrical components of the module 25. Environmentally-hardened housings are generally well known and will not be described in detail herein. In one embodiment, the control module 25 is mounted on the structure 12 (e.g., coupled to the billboard 18), but other locations of the control module 25 are possible in other embodiments.

The memory 36 stores sets (e.g., files) of image data 52. Each set of image data 52 defines an image captured by the camera 22 (FIG. 1). The memory 36 also stores control data 56 indicating predefined times when images of the advertisement 15 are to be captured. As an example, an advertising consumer may purchase an ad term for displaying an advertisement 15. The control data 56 may indicate that an image of the advertisement 15 is to be captured at the start of the ad term, at the end of the ad term, and at other predefined times between the beginning and end of the ad term. In other embodiments, other times may be indicated by the data 56. Based on such data 56 and the clock 51, the control logic 33 is configured to control the camera 22 such that images of the advertisement 15 are captured by the camera 22 at the indicated times. For each captured image, the control logic 33 stores a set of image data 52 defining the image, and the control logic 33 timestamps the set of image data 52 to indicate, based on the clock 51, the time when the image is captured.

When desired, the control logic 33 is configured to transmit one or more of the sets of image data 52 via the network transceiver 49 and the network 50 (FIG. 1) to a server 63 (FIG. 1). The network 50 may comprise any number and types of communication networks, such as a local area network (LAN) and/or a wide area network (WAN). In one exemplary embodiment, the network transceiver 49 is a cellular transceiver that communicates via a cellular network and the Internet to the server 63. In such embodiments, the messages communicated by the control module 25 may be in accordance with transmission control protocol/Internet protocol (TCP/IP) or other suitable protocols.

Note that any set of image data 52 may be discarded (e.g., overwritten or erased) from the memory 36 once it is transmitted to the server 63. It is unnecessary for the module 25 to maintain persistent storage of the image data 52.

For simplicity, FIG. 1 shows a single advertisement 15 and control module 25, but the system 10 may have any number of advertisements and control modules in other embodiments. The server 63 may be configured to communicate with any number of control modules for monitoring any number of advertisements according to the techniques described herein.

Figure 6:
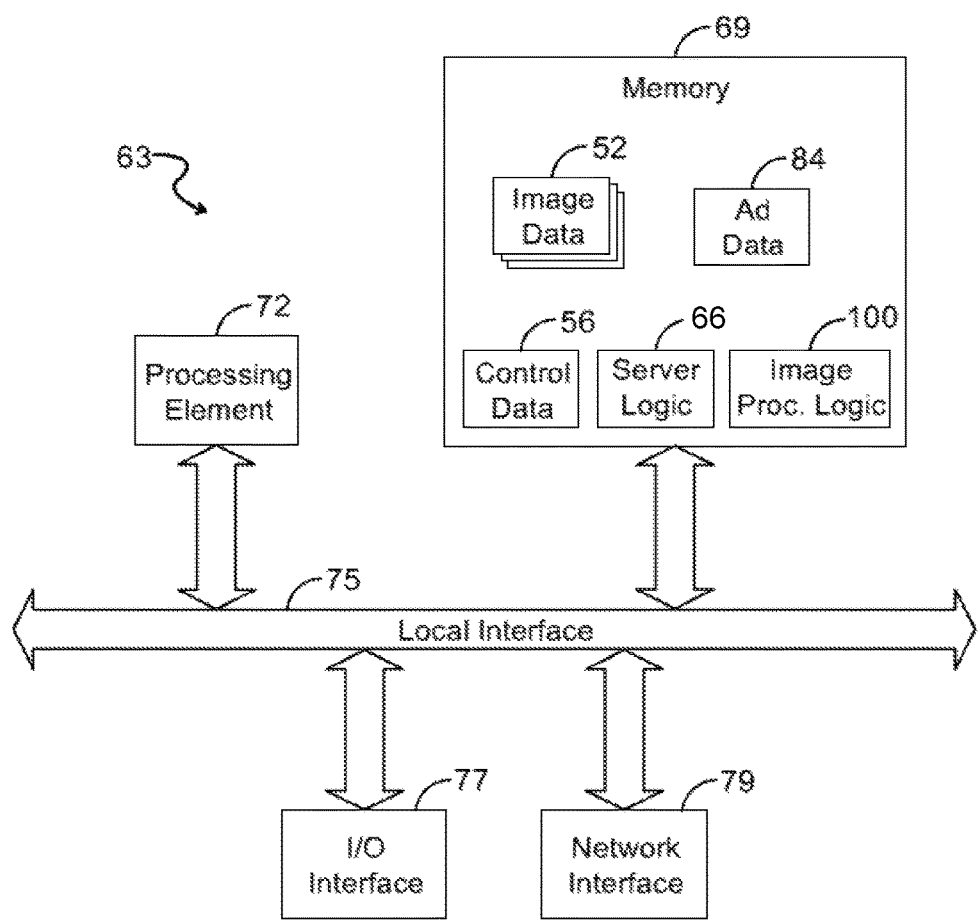
FIG. 6 is a block diagram illustrating an exemplary embodiment of a server, such as is depicted by FIG. 1.

FIG. 6 depicts an exemplary embodiment of the server 63. As shown by FIG. 6, the server 63 comprises server logic 66 for generally controlling the operation of the server 63, as will be described in more detail hereafter. The server logic 66 can be implemented in software, hardware, firmware or any combination thereof. In the exemplary server 63 illustrated by FIG. 6, the server logic 66 is implemented in software and stored in memory 69. Note that the server logic 66, when implemented in software, can be stored and transported on any computer-readable medium for use by or in connection with an instruction execution apparatus that can fetch and execute instructions.

The exemplary server 63 depicted by FIG. 6 comprises at least one conventional processing element 72, such as a central processing unit (CPU), that communicates to and drives the other elements within the server 63 via a local interface 75, which can include at least one bus. As an example, when the server logic 66 is implemented in software, the processing element 72 is configured to execute instructions of such software. The server 63 also comprises an input/output (I/O) interface 77 for receiving inputs and providing outputs as may be desired. A network transceiver 79 (e.g., Ethernet adapter) is configured to communicate with the network 50 (FIG. 1).

Inputs defining the control data 56 may be received via the I/O interface 77 or otherwise. As an example, a user of an advertising agency may provide inputs specifying the beginning and end times of an ad term purchased by an advertising consumer. The server logic 66 is configured to download the control data 56 to the control module 25 via the network 50. In addition, the server logic 66 is configured to store in memory 69 the sets of image data 52 received from the control module 25. As an example, the sets of image data 52 may be stored on a hard drive or other type of memory where the sets of image data 52 may be persistently maintained. When desired, the sets of image data 52 may be accessed by a local or remote user via the I/O interface 77 and/or a user computing device 80 (FIG. 1), such as a desktop, laptop, or handheld computer, a cellular telephone, or other type of device capable of communicating via a network.

In one exemplary embodiment, the advertisement 15 is associated with an identifier, referred to herein as "ad identifier," that identifies the advertisement 15 relative to other advertisements monitored by the system 10. In addition, each control module 25 is associated with an identifier, referred to herein as "module identifier," that identifies such module 25 relative to other control modules 25 in the system 10. In one exemplary embodiment, the network transceiver 49 is cellular transceiver, and the module identifier is the electronic serial number (ESN) that is assigned to the network transceiver 49 as its identifier in the cellular network. In other embodiments, other types of module identifiers may be used. Further, as shown by FIG. 6, the server 63 stores ad data 84 that correlates the ad identifiers and the module identifiers. Specifically, the ad data 84 correlates the module identifier for a given control module 25 with the ad identifier of the advertisement 15 for which the control module 25 receives captured images.

Each message transmitted to and received from a control module 25 includes the module identifier of such module 25. Thus, when the server logic 66 receives a set of image data 52 from a control module 25, the server logic 66 can correlate such set of image data 52 with the appropriate ad identifier. In this regard, using the module identifier in the received message, the server logic 66 looks up the correlated ad identifier in the ad data 84 and associates this ad identifier with the set of image data 52. Thus, when sets of images of multiple advertisements are stored in memory 69 at the server 63 or other location, the ad identifiers associated with the image data 52 can be used to find images of an advertisement of interest. In particular, the advertisement's ad identifier can be used as a key to lookup the set or sets of image data 52 pertaining to a particular advertisement of interest.

If the user of the computing device 80 desires to view one or more images of the advertisement 15 depicted by FIG. 1, the user may establish a communication session with the server 63 via the network 50 and specify an ad identifier pertaining to the advertisement 15 of interest. Based on such identifier, the server logic 66 is configured to retrieve at least one set of image data 52 for the advertisement 15 and to transmit the set of image data 52 to the computing device 80, which may then render the set of image data 52 to the user. As an example, based on the ad identifiers and timestamps, the server logic 66 may retrieve and transmit the most recent set of image data 52 associated with the identified advertisement 15. Alternatively, the server logic 66 may transmit a plurality (e.g., all) of the sets of image data 52 associated with identified advertisement. In yet another embodiment, the user may provide inputs to specify which set or sets of image data 52 are to be retrieved and transmitted. Based on the timestamps in the image data 52, the time of capture for each image may also be displayed so that the user is informed of when each displayed image was captured by the system 10.

In one exemplary embodiment, when the user is requesting retrieval of image data 52, the user provides input for specifying a time period of interest, such as specifying a beginning time and ending time of the time period or just a predefined period, such as within the last 24 hours or 1 week. The server logic 66 then searches for and retrieves the sets of image data 52 captured during the identified time period. In this regard, the server logic 66 finds sets of image data 52 having timestamps within the identified time period and transmits such sets of image data 52 to the computing device 80 for viewing by the user. In other embodiments, other techniques for monitoring the image data 52 and providing sets of image data 52 to the user are possible.

Note that the ad data 84 may indicate various attributes about the advertisements 15 monitored by the system 10 in addition to correlating identifiers. As an example, for each advertisement 15, the ad data 84 may indicate various information, such as the name and contact information of the advertising consumer who purchased the advertisement, the times of the ad term, the amount paid for the advertisement 15, and other information that may be of interest to the advertising consumer and/or the advertising agency associated with the advertisement 15. The ad data 84 may be stored in a database for which the server logic 66 can query in order to discover attributes about an advertisement 15 being monitored.

In one exemplary embodiment, the server logic 66 uses the ad data 84 in order define at least a portion of the control data 56. Specifically, for each advertisement 15, the server logic 66 is configured to consult the ad data 84 in order to determine the beginning and ending times of the ad term for the advertisement 15. Based on such times, the server logic 66 automatically schedules via the control data 56 an image capture event at the beginning of the ad term and another image capture event at the end of the ad term. Thus, an image of the advertisement 15 is automatically captured and stored at the beginning of the ad term, and another image of the advertisement 15 is automatically captured and stored at the end of the ad term. As described above, additional image capture events can be scheduled based on the ad data 84 or otherwise.

In addition, the system 10 preferably permits the user to request image capture events on demand. For example, assume that the user wishes to check the status of the advertisement 15. In such case, the user may provide inputs to the device 80 for defining a request, referred to herein as an "image capture request," identifying the advertisement 15 for which the user would like to see a real-time image. The device 80 transmits such request to the server 63. Using the ad identifier in such message, the server logic 66 retrieves from the ad data 84 at least one module identifier of at least one control module 25 that is used for monitoring the identified advertisement 15 and transmits a command, referred to herein as an "image capture command," for instructing such control module 25 to perform an image capture event. In response, the control logic 33 (FIG. 5) of the foregoing control module 25 controls the camera 22 such that it captures an image of the advertisement 15, thereby defining a set of image data 52. To complete the image capture command, the control logic 33 transmits the foregoing set of image data 52 to the server 63 via the network 50.

Upon receiving such set of image data 52, the server logic 66 forwards the set of image data 52 to the user computing device 80, which renders the set of image data thereby displaying the image of the advertisement 15 captured by the camera 22. Accordingly, at any time, a user can contact the server 63 from a remote location in order to view an image of the advertisement 15 in real time thereby allowing the user to check the current status of the advertisement 15 without traveling to its actual location.

Referring to FIG. 1, the lighting fixture 16 is coupled to a lighting sensor (LS) 88 that can be used to monitor the lighting conditions of the advertisement 15. In this regard, the lighting sensor 88 is mounted on the lighting fixture 16 (although other locations of the sensor 88 are possible) and is configured to sense when the fixture's light source is on (i.e., emitting light). There are various types of sensors 88 that may be used to sense when the light source is on. As an example, the lighting sensor 88 may be a current or power sensor that senses when current is flowing through at least one light source 19. If the sensor 88 determines that at least a threshold amount of current or power is flowing through the light source 19, then it can be assumed that the light source 19 is on and, therefore, actively emitting light. In another example, the lighting sensor 88 may be configured to sense light intensity. If the sensed intensity exceeds a predefined threshold, then it can be assumed that at least one light source 19 is on. In other embodiments, other types of sensors may be used to determine whether at least one light source 19 is on.

The control logic 33 is configured to determine when at least one light source 19 held by the fixture 16 should be on during normal operation and, during such time periods, to detect a lighting anomaly if the logic 33 determines, based on the sensor 88, that the light source is in fact off. As an example, the control data 56 may define time periods that at least one light source 19 is to be on. Based on the clock 51, the control logic 33 controls the light source 19 in order to activate it during such time periods. As an example, the light source 19 may be coupled to a switch (not shown) that selectively blocks current to the light source 19. The control logic 33 may activate the light source 19 by transitioning the switch from an open state to a closed state such that current should flow through the light source 19, causing it to turn on and emit light, if it is operating correctly. However, it is possible for the light source 19 to burn out or otherwise fail such that it fails to emit light after the switch is closed.

In one exemplary embodiment, after activating at least one light source 19, the control logic 33 checks the sensor 88 to determine whether the light source 19 is, in fact, on. If not, the control logic 33 detects a lighting anomaly and transmits to the server 63 a message indicative of the anomaly. The server logic 66 is configured to then display the message, transmit the message to a predefined address, such as an email address, or otherwise communicate or process the message in order to alert a user of the detected anomaly. Thus, a user can become aware of the anomaly shortly after its occurrence and without having to travel to the location of the advertising structure 12, and the user may take corrective action, such as sending a technician to the location of the advertising structure 12 in order to replace the burned out or defective light source 19.

In another example, images captured by the camera 22 may be used to discover a burned out or defective light source 19. For example, by analyzing an image defined by the data 52, a user may notice that the advertisement is not well lit. Based on such image, the user may determine that at least one light source 19 is not properly operating and take corrective action as may be desired. In another example, the image data 52 may be automatically analyzed by the control logic 33, server logic 66, or otherwise to automatically determine when the image is not sufficiently bright and, in response, detect a lighting anomaly. Yet other techniques for detecting a burned out or defective light source 19 are possible in other embodiments.

Note that the dimensions of the advertisement 15 and/or billboard 18 can be relatively large. As an example, it is common for the height of a billboard 18 to range from about 10 feet up to about 20 feet or more and for the width of a billboard 18 to range from about 20 feet up to about 60 feet or more. Further, in some embodiments, the arm 20 to which the lighting fixture 16 and camera 22 are mounted may extend only a few feet (e.g., about 5 feet to 6 feet) from the billboard 18. In such case, the image captured by the camera 22 may be distorted due to the camera 22 being located so close to the billboard 18 with a field of view set to capture all or a significant portion of the advertisement 15. To help capture a wide area of the advertisement 15, the camera 22 preferably has a fish-eye lens (e.g., a 120 degree fish-eye lens), but the captured images may appear distorted when the camera 22 is located close to the advertisement 15.

Referring to FIG. 6, the server 63 comprises image processing logic 100 that is configured to process the image data 52 in order to compensate and correct for distortion. As an example, for a distorted image, the image processing logic 100 may reshape the image and adjust (e.g., average) pixel values in order to provide a distortion-compensated image that more resembles the actual look of the advertisement 15. Note that the image processing logic 100 may be implemented in software, hardware, firmware or any combination thereof. In the exemplary embodiment illustrated by FIG. 6, the image processing logic 100 is implemented in software and stored in memory 69. When implemented in software, the image processing logic 100 can be stored and transported on any computer-readable medium for use by or in connection with an instruction execution apparatus that can fetch and execute instructions.

Depending on the size of the advertisement, it may be desirable to use a plurality of cameras to capture images of the advertisement 15 and/or a plurality of lighting fixtures to illuminate the advertisement. As an example, FIG. 7 shows an exemplary embodiment of an advertising system 110 having an additional lighting fixture 116, camera 122, control module 125, and lighting sensor 188, which can be configured identically to the lighting fixture 16, camera 22, control module 25, and lighting sensor 88, respectively, except that the control module 125 has a different module identifier relative to the control module 25.

Figure 8:
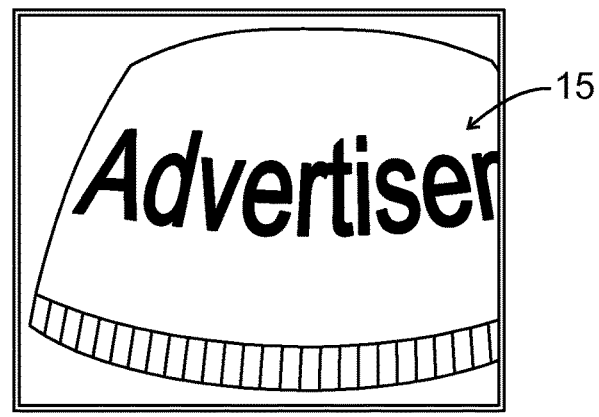
FIG. 8 illustrates an exemplary image captured by a camera of the system depicted by FIG. 7.
Figure 9:
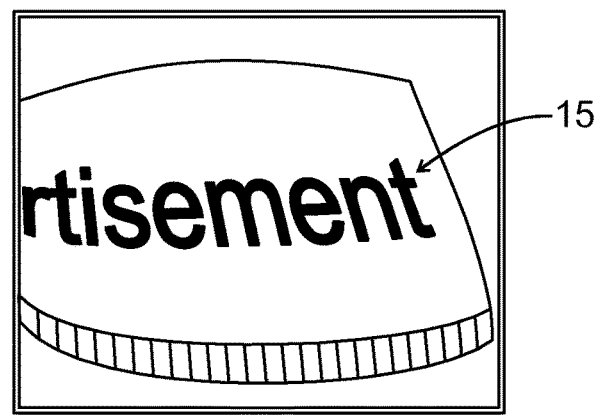
FIG. 9 illustrates an exemplary image captured by another camera of the system depicted by FIG. 7.

Each camera 22 and 122 is positioned to view a different portion of the advertisement 15, and the images from both cameras 22 and 122 are stitched together by the image processing logic 100 in order to define a single image. As an example, FIG. 8 depicts an image of an exemplary advertisement 15 captured by the camera 122, and FIG. 9 depicts an image of the same advertisement 15 captured by the camera 22. Each such image is distorted and shows only a portion of the overall advertisement 15. In this regard, the advertisement 15 in reality has a rectangular shape, but the captured images show a non-rectangular advertisement 15 having curved or warped edges due to distortion resulting from the close proximities of the cameras 22 and 122 relative to the advertisement 15. The control module 125 transmits to the server 63 a set of image data 52 defining the image captured by the camera 122, and the control module 25 transmits to the server 63 a set of image data 52 defining the image captured by the camera 22.

Figure 7:
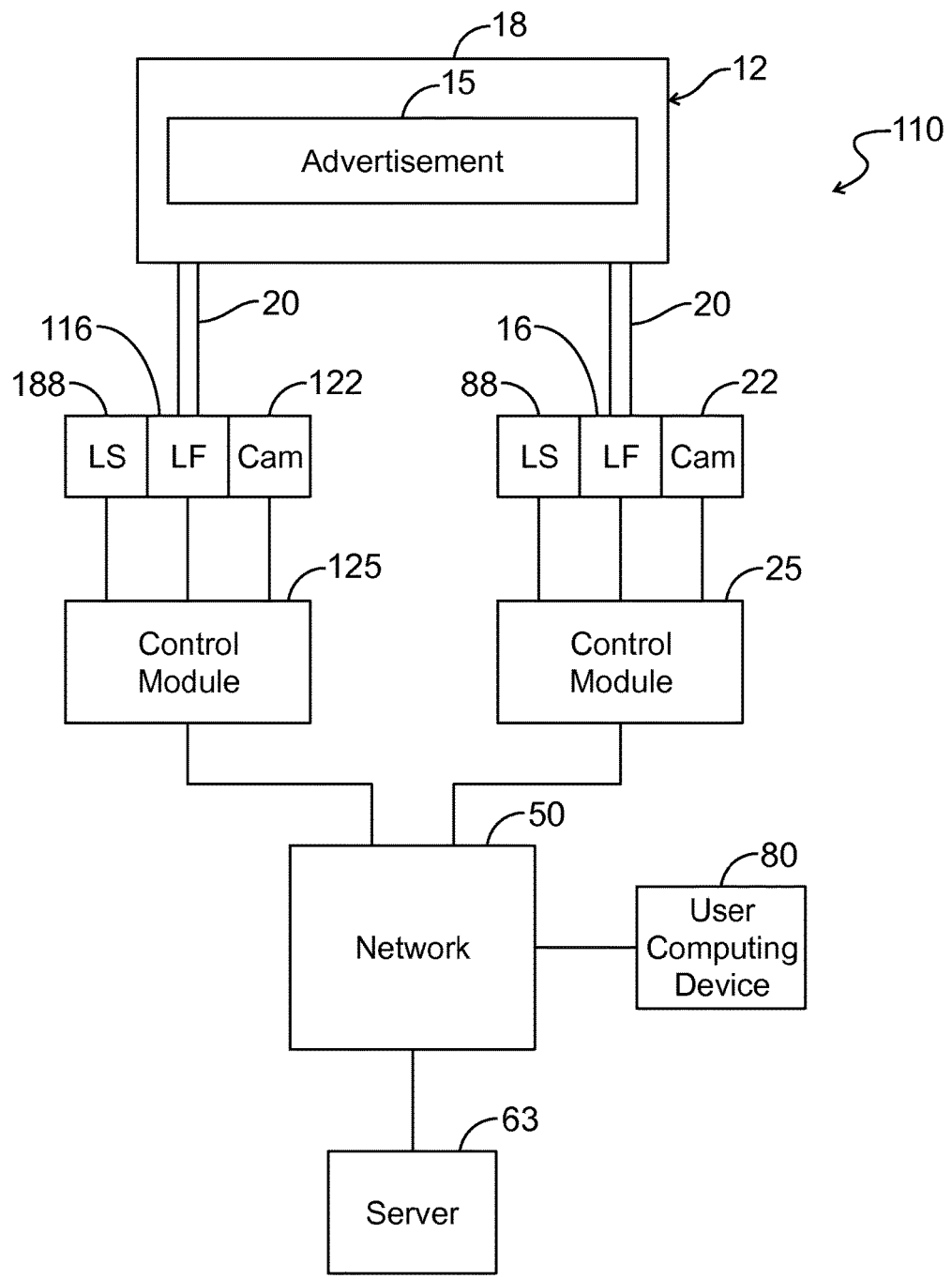
FIG. 7 is a block diagram illustrating an exemplary embodiment of a system for monitoring advertisements.

Note that when multiple cameras are used to monitor the same advertisement, as is the case for FIG. 7, the ad data 84 stored at the server 63 correlates the same ad identifier with multiple module identifiers. As an example, in the embodiment for FIG. 7, the ad data 84 correlates the ad identifier for the advertisement 15 with the module identifier of control module 25 and the module identifier of the control module 125. Based on such data 84, the server logic 66 can determine that, in order to define an image of the advertisement 15, multiple images are to be captured and stitched together.

Figure 10:
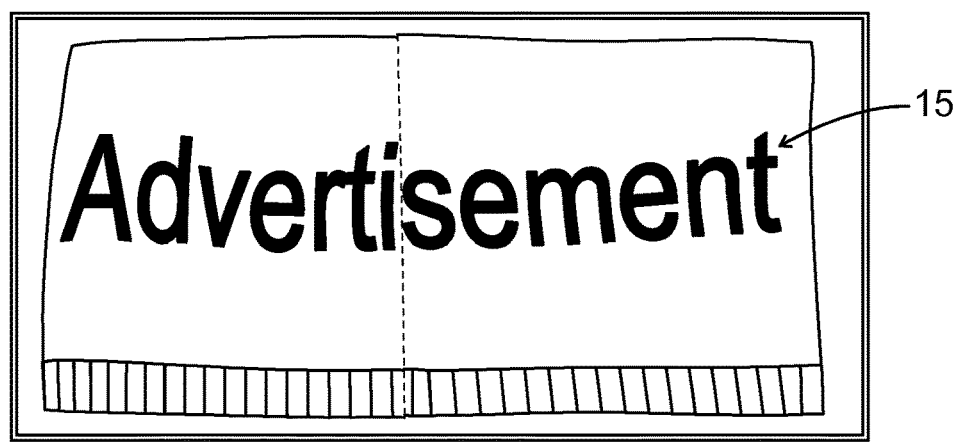
FIG. 10 illustrates an exemplary image formed by processing image data defining the images depicted by FIGS. 6 and 7.

When the server logic 66 receives the two sets of image data 52 from the control modules 25 and 125, respectively, the server logic 66 provides such sets of image data 52 to the image processing logic 100 along with instructions for combining such image data 52. In response, the image processing logic 100 is configured to correct for distortion and to stitch the two images together to define a new set of image data 52 defining a single image of the advertisement 15, as shown by FIG. 10. This new set of image data 52 may be transmitted to the user computing device 80 for viewing by a user. The processing performed by the logic 100 results in an image that more accurately represents the actual look of the advertisement 15 such that the user views a high quality image of the advertisement 15 despite the distortion introduced by the cameras 22 and 122 and the limited view of the cameras 22 and 25.

In the embodiment shown by FIG. 7, two cameras 22 and 122 are used that are controlled by two modules 25 and 125, respectively. It should be emphasized that any number of cameras may be used to capture images of the advertisement. In addition, a single control module 25 may be used to control and process data from multiple cameras. As an example, referring to FIG. 7, it is possible for the control module 25 to be used to control and process data from both cameras 22 and 122 thereby obviating the need for a second control module 125. In addition, it is possible for any of the cameras 22 and 122 to be video cameras, which provide video images of the advertisement 15. Such cameras may be particularly beneficial for advertising structures that change their advertising content frequently. As an example, an electronic advertising structure may automatically cycle through a plurality of advertisements where each advertisement is temporarily displayed for a finite period of time followed by the display of another advertisement. By using video images, a user can confirm that an advertisement 15 of interest over time is being displayed for an appropriate amount of time and frequency.

In various embodiments described above, a server 63 is used to receive image data 52 from one or more control modules 25. However, the use of a server 63 for providing image data 52 to a user is unnecessary. As an example, if desired, a control module 25 can be configured to transmit image data 52 directly to a user, such as to the user computing device 80 without the image data 52 being transmitted to the server 63.

Now, therefore, the following is claimed:

1. An advertisement monitoring system, comprising:
a billboard having an advertisement;
a first camera coupled to the billboard and positioned to view at least a first portion of the advertisement;
a second camera coupled to the billboard and positioned to view at least a second portion of the advertisement;
at least one network transceiver for communicating with a network;
one or more processors; and
one or more computer storage media storing computer-useable instructions that, when executed by the one or more processors, cause the one or more processors to perform operations comprising:
control the first camera such that the first camera captures a first image of the advertisement, the captured first image defined by first image data and distorted by the first camera such that first borders of the advertisement appear curved in the captured first image;
control the second camera such that the second camera captures a second image of the advertisement, the captured second image defined by second image data and distorted by the second camera such that second borders of the advertisement appear curved in the captured second image;
transmit the first image data and the second image data to a server through the network via the at least one network transceiver;
process the first image data to compensate for distortion by reshaping the captured first image such that the first borders of the advertisement are straightened;
process the second image data to compensate for distortion by reshaping the captured second image such that the second borders of the advertisement are straightened; and
combine the processed first image with the processed second image to create a combined image of the advertisement, thereby permitting a user to confirm that the advertisement is displayed on the billboard during an ad term for the advertisement.

2. A method for monitoring advertisements, comprising:
capturing, by one or more processors and a first camera mounted on a billboard, a first image of an advertisement displayed on the billboard thereby defining first image data indicative of the first image, wherein the first image is distorted by the first camera such that a first border of the advertisement appears curved in the first image captured by the first camera;
transmitting the first image data through a network to a server;
storing the first image data at the server;
capturing, by one or more processors and a second camera mounted on the billboard, a second image of the advertisement displayed on the billboard thereby defining second image data indicative of the second image captured via the second camera, wherein the second image is distorted by the second camera such that a second border of the advertisement appears curved in the second image captured by the second camera;
transmitting the second image data through the network to the server;
storing the second image data at the server;
processing, by one or more processors, the first image data to compensate for distortion by reshaping the first image such that the first border of the advertisement is straightened;
processing, by one or more processors, the second image data to compensate for distortion by reshaping the second image such that the second border of the advertisement is straightened;
combining, by one or more processors, the processed first image with the processed second image to form a combined image of the advertisement; and
permitting a user to access the combined image.

* * * * *